March 27, 1962     K. KYLE, SR     3,027,169
TOOL HOLDER
Filed July 20, 1959
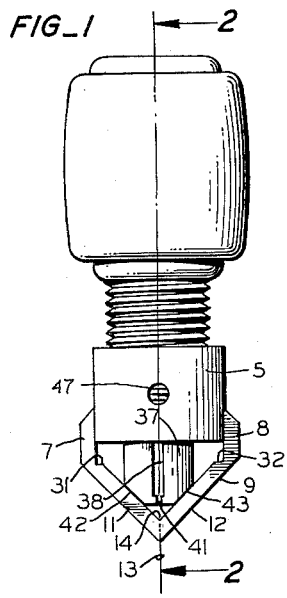
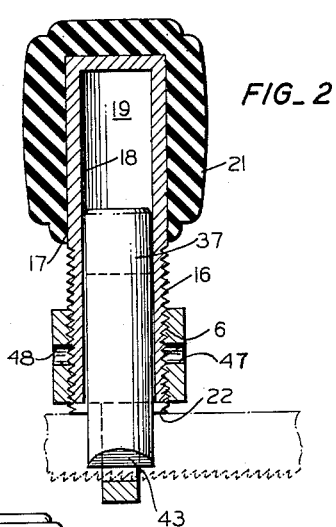
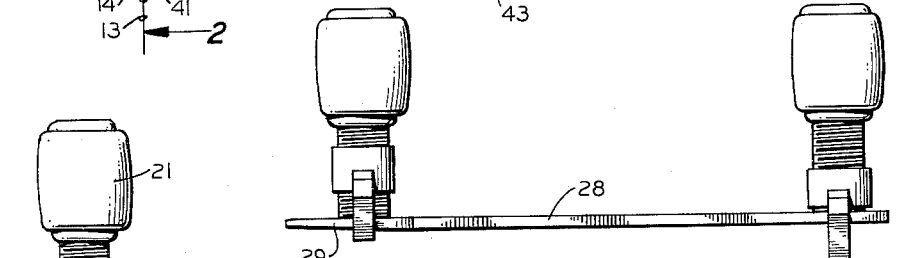
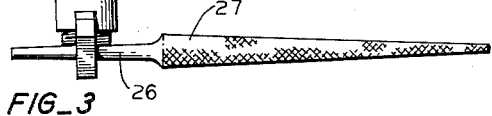
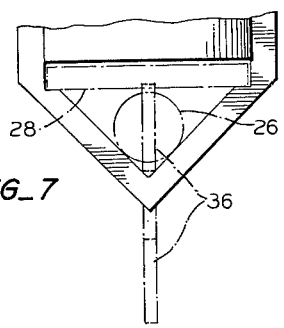
INVENTOR.
KERMIT KYLE, SR.
BY
*Lothrop & West*
ATTORNEYS 3,027,169
TOOL HOLDER
Kermit Kyle, Sr., 111 Harrison Road, Salinas, Calif.
Filed July 20, 1959, Ser. No. 828,274
2 Claims. (Cl. 279—8)

My invention relates to means especially useful as a holder or handle for assisting in the use and manipulation of various tools, such as files, rasps, saws and the like.

An object of the invention is to provide a simple and readily adaptable and usable tool holder which can be momentarily applied to a tool being utilized and as easily removed therefrom for use under other circumstances and with different tools.

Another object of the invention is to provide a tool holder which is capable of receiving any one of a large number of different tools and of providing a firm grip and support therefor.

Another object of the invention is to provide a very simple tool holder which can easily be manufactured and sold economically.

A still further object of the invention is to provide a tool holder which will permit the use of various tools under special circumstances in addition to those circumstances under which they are normally used.

Other objects of the invention, together with the foregoing, are attained in the embodiment of the invention described in the accompanying description and illustrated in the accompanying drawings, in which:

FIGURE 1 is a front elevation of a tool holder constructed in accordance with the invention.

FIGURE 2 is a cross-section, the plane of which is indicated by the lines 2—2 of FIGURE 1, and with a tool portion being shown therein.

FIGURE 3 is a side elevation of a tool holder in accordance with FIGURE 1 shown engaging a rat tail file.

FIGURE 4 is a side elevation of a pair of tool holders made pursuant to the invention, and in engagement with a flat file.

FIGURE 5 is a view similar to FIGURE 3 but showing the tool holder in engagement with a keyhole saw blade.

FIGURE 6 is a view similar to FIGURES 3 and 5 but showing the tool holder in engagement with a hack saw blade.

FIGURE 7 is an enlarged detail showing the stirrup portion of the tool holder, with the position of various tools with respect thereto indicated by broken lines.

Preferably, the tool holder includes a metallic tubular member 5 approximately as long as its diameter and having internal threads 6 from one end thereof to the other. Joined to and extending outwardly and in an axial direction from the tube 5 are the side arms 7 and 8 of a metallic stirrup, generally designated 9. The side arms 7 and 8 are secured to the tube 5 substantially at the opposite ends of a diameter thereof.

Also included in the stirrup 9 and merging with the arms 7 and 8 are dihedral bars 11 and 12. The arms 7 and 8 and the bars 11 and 12 are preferably substantially square in cross-section. The bars 11 and 12 converge toward the axis 13 of the tube 5 as they extend away from the tube itself so that they provide a dihedral apex 14 on the axis 13 of the tube.

Designed to engage the internal threads 6 are external threads 16 formed on one portion of a plug 17. This is preferably a substantially hollow member defining an interior chamber 18 and closed by a cap 19 at one end. When the plug 17 is rotated in the tube 5, it is simultaneously axially translated with respect thereto. The plug is provided with a handle 21 conveniently formed of rubber or rubber-like material. A user, by grasping the handle 21 and rotating it, moves the leading edge 22 of the plug 17 toward or away from the apex 14 of the stirrup 9. The leading edge is preferably a planar annular face normal to the axis 13.

As particularly shown in FIGURE 3, the end 26 of a rat tail file 27, for example, or rasp, can be rested in the stirrup 9 lying against the bars 11 and 12. When the handle 21 is appropriately rotated, the lower edge 22 of the plug descends toward the stirrup and eventually lies against the tool end 26. When the handle 21 is firmly tightened with respect to the tube 5, the tool 27 is firmly gripped. Then, the handle 21 serves as a means for advancing and retracting the tool in use. When the use is completed, a retrograde movement of the handle 21 releases the tool end 26 and another tool can be substituted therefor.

If, as shown in FIGURE 4, the tool to be engaged is a flat file 28 having an end 29, the end can be rested against the bars 11 and 12. If the end 29 is accurately placed in a substantially symmetrical position, it will be evenly borne upon by the descending edge 22 of the plug when the handle 21 is appropriately rotated so that the end 29 is readily gripped. The file 28 can be utilized with simply one tool holder but preferably is for some jobs provided with a second tool holder. This is identical with the first but is slipped over the relatively wider, flat end of the file 28 opposite the end 29. In order to accommodate flat files of substantial width, the bars 11 and 12 on the stirrup adjacent their merger with the arms 7 and 8 may be provided with rectangular notches 31 and 32. These form a nether support for the flat portion of the file and serve as abutment jaws opposing the edge 22. As before, when a different tool is to be utilized, the handles 21 are readily loosened and the tool holders are detached from the tool.

In some instances, it is desired to hold a tool having a relatively narrow but high gripping portion. For example, as shown in FIGURE 5, a keyhole saw blade 34 has such an end portion 36. Under these circumstances, while the portion 36 can be directly rested against the bars 11 and 12 without other supporting contact, there is then but a very narrow surface against which the edge 22 must abut. To improve the stability of narrow tools, advantage is taken of the hollow plug chamber 18 in the plug 17.

Loosely disposed therein is a gripper 37 comprising a cylindrical piece of metal stock having a central slot 38 extending axially thereof from one end toward but not entirely to the other end thereof. The slot 38 can be slightly narrowed to provide a smaller entrance slot 41 at one end, if desired. Also, the lower end of the member 37 is provided with beveled faces 42 and 43 inclined at substantially the same angle as the adjacent bars 11 and 12. Although the member 37 is loosely slidable within the chamber 18, it serves as a lateral support for the blade end 36.

For example, the normal relatively thin blade end 36 is inserted rather loosely into the slot 38, as shown in FIGURE 5, and this portion of the blade is then held symmetrically on the center line or axis 13 and midway between the bars 11 and 12. Furthermore, the upper surface of the blade end 36 is then held substantially parallel to the edge 22 of the plug 17. Thus, when the handle 21 is rotated, the edge of the plug 17 engages the top of the blade end 36 and forces the blade downwardly toward the apex 14 with the blade being accurately centered between the bars 11 and 12. If the blade end 36 is relatively thick, there may be a slight spreading action of the bifurcated portion of the member 37 when the blade end is first inserted therein which assists in firmly holding the blade 34 in position. After this installation is made, the tool holder is utilized as before and at the end of the use the tool holder can readily be detached.

When a hack saw blade 46 is to be gripped, it is inserted in the slot 38 as just described and the handle 21 is tightened by rotation. The blade 46 is held at any point along its length in a firm fashion and without tipping from one side to the other, being accurately centered by the bars 11 and 12 adjacent their apex 14 and being supported for square engagement with the edge 22 by the member 37.

Under some circumstances, it is possible to use the device without the stirrup by providing holes 47 and 48 in the tubular member 5. When the plug 17 is raised far enough, a tool, such as the tang of a small file, is introduced through both holes 47 and 48 and the member 5 is tightened down upon it. The holes 47 and 48 can be of different diameters to accommodate tapered tools, if desired, and being circular, form firm seats for the tool being held.

What is claimed is:

1. A tool holder comprising a frame including an internally threaded tube and including a stirrup having dihedral bars adapted directly to engage a tool and centered on the axis of said tube, an externally threaded hollow plug engaging said tube and movable therethrough toward and away from said bars, and means disposed in said hollow plug and having bifurcations each engaging a respective one of said bars for holding a tool passing through said stirrup.

2. A tool holder comprising a tube having an axis, a stirrup supported on and extending from one end of said tube, said stirrup including a pair of bars having planar interior surfaces adapted directly to engage a tool and converging toward and merging at an apex on said axis, a hollow plug open at the end thereof adjacent said stirrup, said plug being engageable with said tube and movable along said axis toward and away from said apex, means on said plug providing an annular face normal to said axis and confronting said bars to engage a tool therebetween, and means smaller in diameter than said annular face slidably disposed in and projecting from said plug toward said stirrup and provided with an axially extending slot for supporting a tool resting on said stirrup.

References Cited in the file of this patent

UNITED STATES PATENTS

| | | |
|---|---|---|
| 384,741 | Blegen | June 19, 1888 |
| 459,652 | Roscoe | Sept. 15, 1891 |
| 1,457,994 | Nedland | June 5, 1923 |

FOREIGN PATENTS

| | | |
|---|---|---|
| 22,467 | Great Britain | Nov. 6, 1897 |